United States Patent
Minami et al.

[11] Patent Number: 6,079,463
[45] Date of Patent: Jun. 27, 2000

[54] PNEUMATIC RADIAL TIRE WITH BAND-BELT AND TRIPLE RADIUS TREAD PROFILE

[75] Inventors: Nobuaki Minami; Toshihiro Okada, both of Shirakawa, Japan

[73] Assignee: Sumitomo Rubber Industries, Ltd., Hyogo-Ken, Japan

[21] Appl. No.: 08/988,966

[22] Filed: Dec. 11, 1997

[30] Foreign Application Priority Data

Dec. 25, 1996 [JP] Japan ..................... 8-345985

[51] Int. Cl.[7] .............. B60C 9/18; B60C 9/20; B60C 9/22; B60C 11/00
[52] U.S. Cl. ............. 152/209.14; 152/526; 152/531; 152/533; 152/538
[58] Field of Search ................ 152/209.14, 526, 152/531, 434, 533, 538

[56] References Cited

U.S. PATENT DOCUMENTS 5,222,537  6/1993  Saito et al. ............... 152/209.14

FOREIGN PATENT DOCUMENTS

| | | |
|---|---|---|
| 0313362A2 | 4/1989 | European Pat. Off. . |
| 0402303A1 | 12/1990 | European Pat. Off. . |
| 0424155A2 | 4/1991 | European Pat. Off. . |
| 0739759A2 | 10/1996 | European Pat. Off. . |
| 4002824A1 | 9/1990 | Germany . |

*Primary Examiner*—Adrienne C. Johnstone
*Attorney, Agent, or Firm*—Birch, Stewart, Kolasch & Birch, LLP

[57] ABSTRACT

A pneumatic radial tire comprises a breaker-belt disposed radially outside a carcass, and a band-belt disposed radially outside the breaker-belt and having organic fiber cords laid in substantially parallel with the tire equator. In the meridian section of the tire which is mounted on a standard rim and inflated to 0.5% of a standard inner pressure, the tread has a triple radius profile and the band-belt having a variable ply number accommodated to the triple radii of the tread such that the number of plies throughout more than sixty percent (60%) of the axial width of the parts of the tread having the first, second and third radii of curvature, respectively, are different from each other. The tread profile is composed of a central part of a radius R1, a pair of middle parts of a radius R2, and a pair of shoulder parts of a radius R3. For example, the ply number N1 in the central part is 0, the ply number N2 in the middle parts is 1, and the ply number N3 in the shoulder parts is 2.

4 Claims, 4 Drawing Sheets

Conventional Art

Fig.6
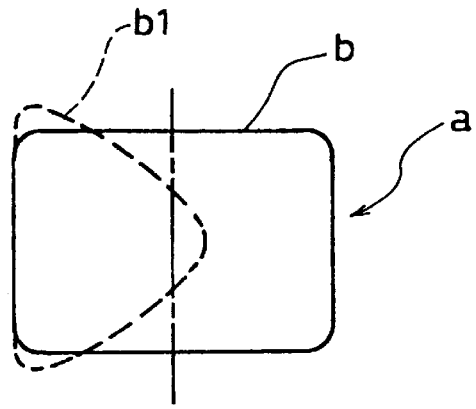
Conventional Art
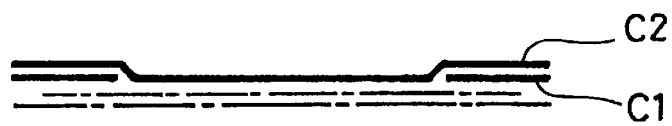
Fig.7(A)
Conventional Art
Fig.7(B)
Conventional Art
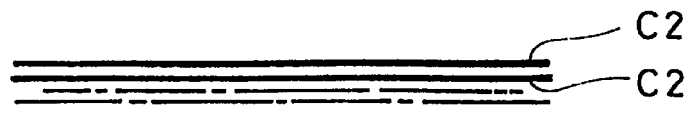
Fig.7(C)
Conventional Art

PNEUMATIC RADIAL TIRE WITH BAND-BELT AND TRIPLE RADIUS TREAD PROFILE

BACKGROUND OF THE INVENTION

The present invention relates to a pneumatic radial tire more particularly an improved tread portion capable of improving high speed durability, high speed handling, ride comfort, tire weight and the like.

In general, pneumatic tires used under high speed conditions such as radial tires for sports cars, passenger cars and the like are provided in the tread portion with tread reinforcing belts. The belts include a breaker wound on the radially outside of a carcass and a band wound outside the breaker. Here, the band has a very small cord angle with respect to the tire equator, for example, 0 plus minus 5 degrees, and the breaker has a relatively large cord angle. As shown in FIG. 7, such a band belt include one or two full-width bands C2 and optionally one or two edge bands C1. The edge bands C1 are disposed in only the axial edge portions for the purpose of preventing belt edge separation caused by a centrifugal force during high speed running. The full-width bands C1 are disposed as a radially outermost belt ply for high speed handling performance.

Such a belt structure greatly increases the rigidity of the tread portion, which as show in FIG. 5, hinders the inside tread half (a) from contacting with the ground during cornering, and as a result, as show in FIG. 6, the ground contacting area changes its shape from a broader rectangular shape (b) to a undesirable narrow triangular shape (b1). Even in wide-tread tires whose aspect ratio is less than 60%, it is difficult to maintain a preferable ground contacting shape. Therefore, road grip during cornering decreases, and transitional cornering characteristics are changed greatly. Thus, it is difficult to improve high speed cornering performance, high speed maneuverability and the like. Further, it is difficult to improve ride comfort and to decrease the belt weight or the tire weight.

BRIEF SUMMARY OF THE INVENTION

It is therefore, an object of the present invention to provide a pneumatic radial tire, in which the band belt is minimized to decrease the tire weight without decreasing the ability to control the lifting of the belt edges, and at the same time the high speed durability, high speed straight running performance and cornering performance, ride comfort and the like are improved.

According to one aspect of the present invention, a pneumatic radial tire comprises a tread portion with a tread, a pair of sidewall portions, a pair of bead portions, a carcass extending between the bead portions, a breaker-belt disposed radially outside the carcass in the tread portion, and a band-belt disposed radially outside the breaker-belt and having organic fiber cords laid in substantially parallel with the tire equator, wherein, in the meridian section of the tire which is mounted on a standard rim and inflated to 0.5% of a standard inner pressure, the tread has a triple radius profile, and the band-belt having a variable ply number accommodated to the triple radii of the tread such that the number of plies throughout more than 60% of the axial width of the parts of the tread having the first, second and third radii of curvature, respectively, are different from each other.

The ply-number of the band-belt is decreased from the belt edges to the tire equator. Therefore, although the belt edge separation can be effectively prevented, the hoop effect is decreased in the central part, which allows more expansion of the central part. As a result, the ground pressure relatively decreases in the shoulder part, and the heat generation in the shoulder part can be decreased to improve the high speed durability.

Further, the expansion of the central part allows the ground contacting area to change from a rectangular shape to a more preferable barrel shape, which increases the ground contacting area during cornering as well as straight running.

BRIEF DESCRIPTION OF THE SEVERAL VIEWS OF THE DRAWINGS

Embodiments of the present invention will now be described in detail in conjunction with the accompanying drawings.

FIG. 6 is a diagram showing the shape of the ground contacting area thereof.

FIGS. 7(A), 7(B), and 7(C) show belt structures which are used in conventional tires.

DETAILED DESCRIPTION OF THE INVENTION

Figure 1:
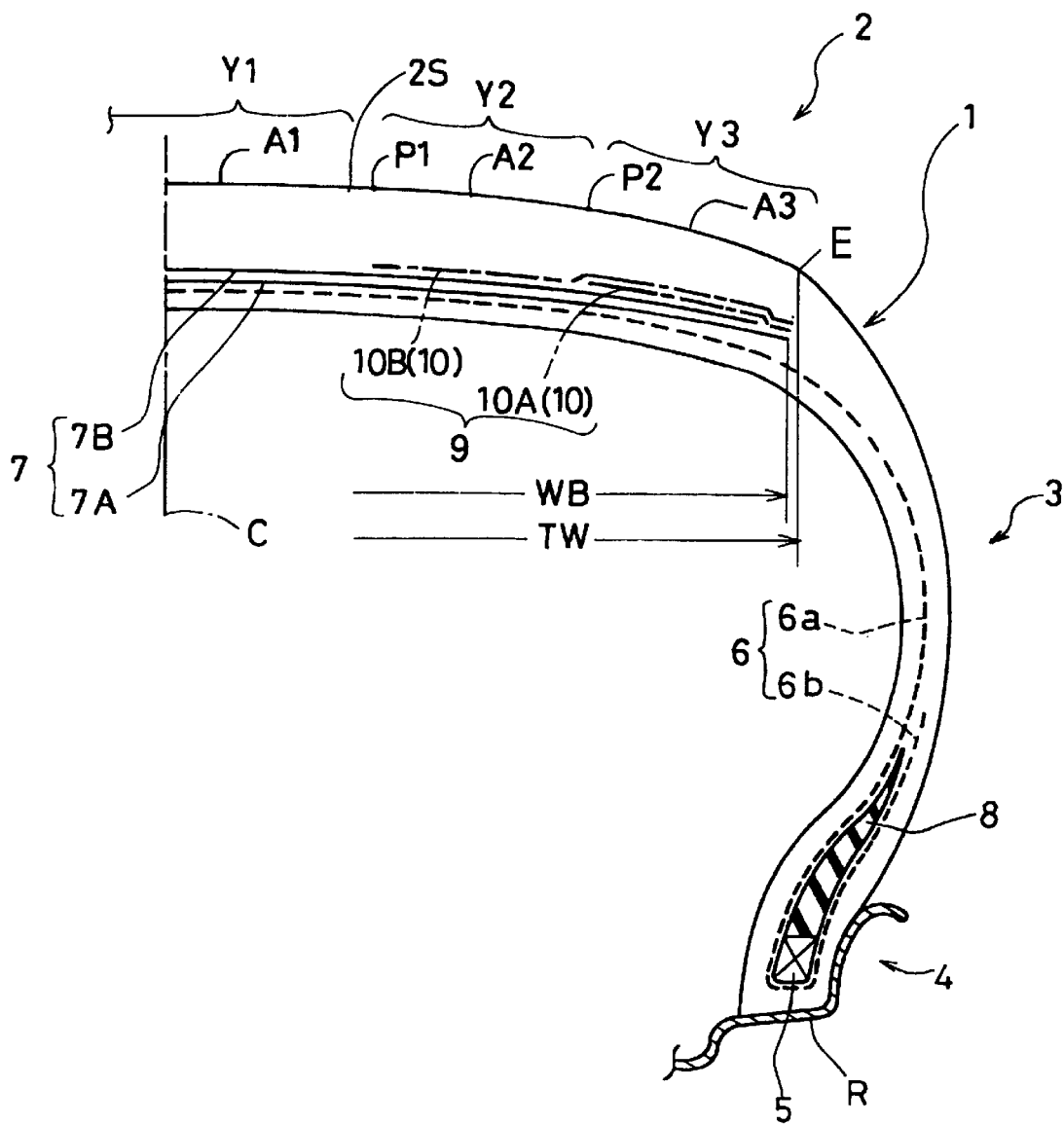
FIG. 1 is a cross sectional view of a tire according to the present invention.

In FIG. 1, the pneumatic radial tire 1 according to the invention comprises a tread portion 2 defining a tread 2S, a pair of axially spaced bead portions 4 with a bead core 5 therein, a pair of sidewall portions 3 extending between the tread edges and the bead portions 4, a carcass 6 extending between the bead portions 4, and belts 7 and 9 disposed radially outside the carcass 6 in the tread portion 2.

The tire in this embodiment is a low aspect ratio passenger car radial tire having a nominal aspect ratio of 50%.

FIG. 1 shows a meridian section of the tire 1 under 0.5% pressure state in which the tire is mounted on a standard rim R and inflated to 0.5% of a standard inner pressure but loaded with no tire load.

The standard rim is the standard rim specified in JATMA, the "Measuring Rim" in ETRTO, the "Design Rim" in TRA or the like. The standard pressure is the maximum air pressure in JATMA, the "Inflation Pressure" in ETRTO, the maximum pressure given in the "Tire Load Limits at Various Cold Inflation Pressures" table in TRA or the like.

Under the 0.5% pressure state, the tread profile well coincide with that of the tire vulcanizing mold. In other words, the tire 1 is formed by vulcanizing a raw tire in a mold which is provided with an inner face having a profile corresponding to the following tread profile, namely the negative profile of the tread profile.

Under the 0.5% pressure state, the tread 2S has a profile composed of a central part Y1, a pair of middle parts Y2, and a pair of shoulder parts Y3, wherein the central part Y1 has a first curve A1 of a radius R1 of which center exists in the tire equatorial plane CO, the middle part Y2 has a second curve A2 having a radius R2 being less than the radius R1 and connected to the first curve A1 at a first point P1, the shoulder part Y3 has a third curve A3 having a radius R3 being less than the radius R2 and connected to the second curve A2 at the second point P2. Thus the tread portion 2 has a triple radius tread 2S. (R1>R2>R3) Preferably, the radius R1 is about 4.5 to 6.0 times the tread width TW between the tread edges E. The radius R2 is about 0.6 to 0.3 times the radius R1. The axial distance L1 between the first point P1 and the tread equator is about 0.34 to 0.24 times the tread width TW. The axial distance L2 between the first point P1 and the second point P2 is less than the distance L1 and about 0.43 to 0.33 times the tread width TW. The axial distance L3 between the second point P2 and the tread edge E is more than the distance L1 and less than the distance L2 and about 0.38 to 0.28 times the tread width TW.

The carcass 6 comprises at least one ply of cords arranged at an angle of from 75 to 90 degrees with respect to the tire equator C, extending between the bead portions 4 through the tread portion 2 and sidewall portions 3, and turned up around the bead cores 5 from the inside to the outside of the tire so as to form a pair of turnup portions 6b and a main portion 6a therebetween. For the carcass cords, organic fiber cords, e.g. polyester, rayon, nylon and the like are used.

In this embodiment, the carcass 6 is composed of a single ply. Between the main portion 6a and each turnup portion 6b, a bead apex 8 made of hard rubber tapering and extending radially outwardly from the bead core 5 is disposed. The radially outer end of the carcass ply turnup portion 6b is located radially outward of the radially outer end of the bead apex 8 and the so called high-turnup structure.

The breaker-belt 7 comprises at least two plies of parallel cords laid at an angle of from 15 to 30 degrees with respect to the tire equator C.

For the breaker-belt cords, non extensible or pull resistant high modulus cords, e.g. aromatic polyamide fiber cords, steel cords and the like can be used. Especially, steel cords are preferably used.

In case of passenger tires, it is preferable that the breaker-belt is composed of two cross plies in view of the rigidity and weight. Thus in this example, the breaker-belt 7 is composed of a radially inner ply 7A and a radially outer ply 7B, the cords in each ply are parallel with each other but crosswise to the next ply.

In order to prevent stress concentration, the inner breaker-belt ply 7A is formed to be wider than the outer breaker-belt ply 7B. The axial width WB of the inner ply 7A is set in the range of from 0.85 to 1.1 times the tread width TW to reinforce the substantially entire width of the tread portion 2.

The above-mentioned band-belt 9 is made of cords laid at an angle of substantially zero degree with respect to the tire equator C. The band-belt 9 comprises a plurality of plies 10, the ply-number of which is changed according to the above-mentioned triple radii R1–R3. The ply-number N1 in the tread central part Y1, the ply-number N2 in the tread middle parts Y2 and the ply-number N3 in the tread shoulder parts Y3 are different from each other. Preferably, N1>N2>N3.

In case of a passenger car tire, it is preferable that N1=0, N2=1 and N3=2, but maybe, it is possible that N1=1, N2=2 and N3=3.

It is possible to form a band ply by winding a strip of tire fabric and splicing the circumferential ends thereof.

However, it is preferable that the band is formed by spirally winding one or more cords around the radially outside of the breaker belt at an angle of almost zero degree with respect to the tire equator C.

For the band cords, organic fiber cords, e.g. nylon, rayon, polyester and the like having a tensile elastic modulus of less than 1000 kg/sq.mm are used. Especially, nylon fiber cords are suitably used for their good durability against bending deformation and processability.

In case of the spiral band, the band ply is formed by spirally winding a ribbon of rubber in which two or three cords are embedded along the length thereof.

Figure 2:
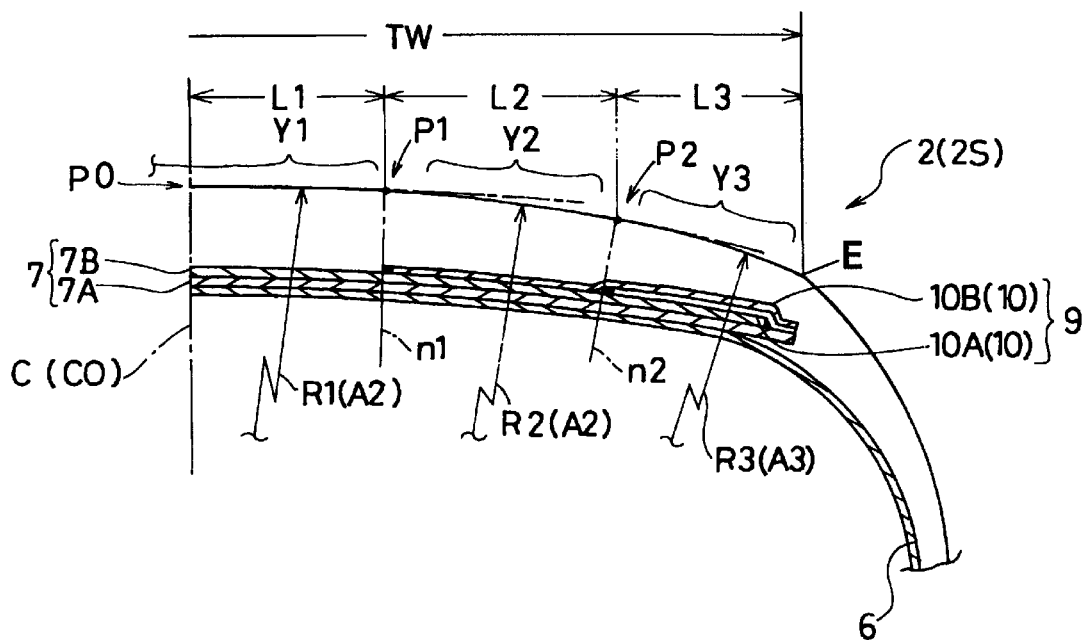
FIGS. 2, 3 and 4 are cross sectional views each showing an example of the belt structure.
Figure 3:
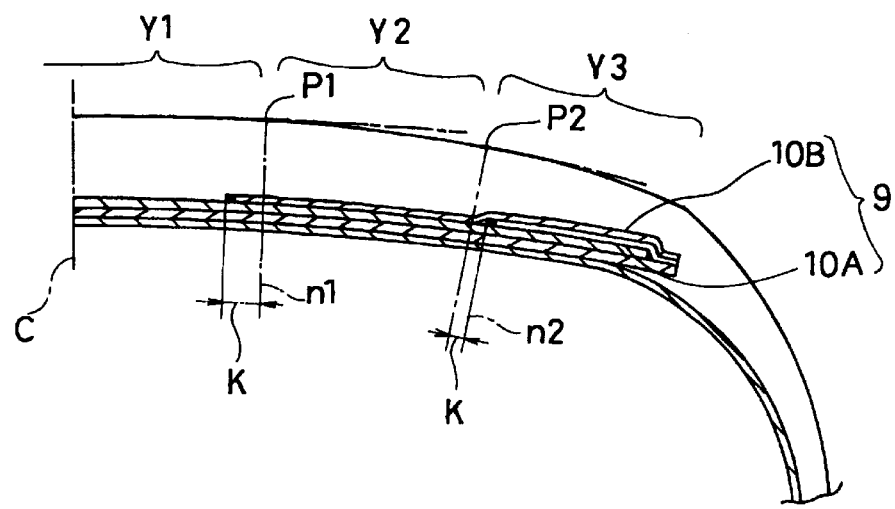

FIG. 2 shows an example in which the ply-numbers N1=0, N2=1 and N3=2. Accordingly, the band-belt 9 is composed of a pair of axially spaced parts, each composed of a radially inner narrow ply 10A and a radially outer wide ply 10B. Each of the inner plies 10A is disposed on the radially outside of the breaker-belt 9 to cover each edge thereof. The outer ply 10B is disposed on the radially outside of the inner ply 10A.

The axially outer edges of the inner and outer plies 10A and 10B are substantially aligned with the breaker edges or the edges of the widest inner breaker-belt ply 7A so that the axial distance measured axially outwardly from the axially outer end of the inner breaker-belt ply 7A is preferably in the range of from 0 to 3 mm.

The axially inner edge of the inner ply 10A reaches near a straight line n2 normal to the tread 2S which is drawn radially inwardly from the second point P2. The axially inner edge of the outer ply 10B reaches near a straight line n1 normal to the tread 2S which is drawn radially inwardly from the first point P1.

It is preferable that the axially inner edges of the band plies 10A and 10B are positioned on the normal lines n1 and n2 so that the ply-number is zero throughout the central part Y1, one throughout the part Y2 and two throughout the part Y3.

In practice, however, it is possible to somewhat shift axially inwardly or outwardly from the normal lines. The dislocation K should be limited to less than 0.2 times, preferably 0.1 times, more preferably 0.05 times a distance which is the axial distance L1, L2 or L3 of the part Y1, Y2 or Y3 in which the ply edge is located.

Figure 4:
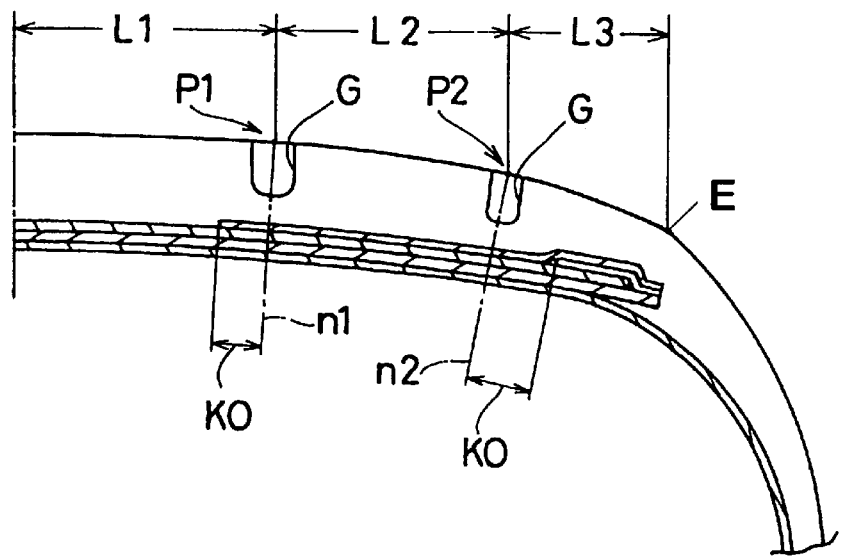
Figure 5:
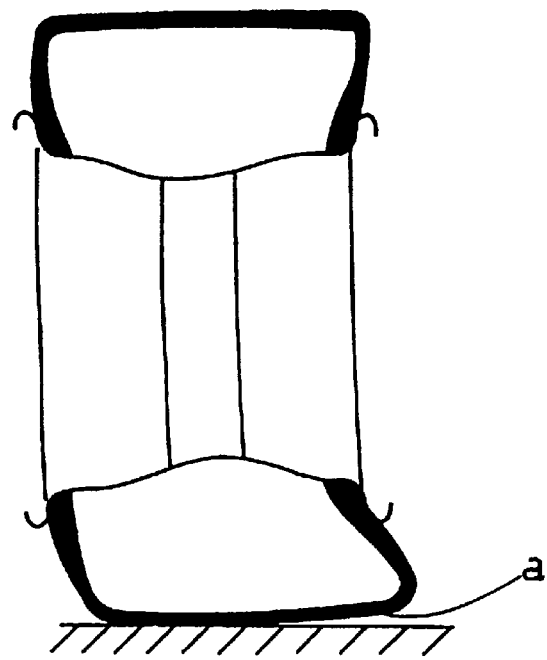
FIG. 5 is a cross sectional view of a conventional tire showing deformation of the tread portion during cornering.

On the other hand, it is not preferable that the axially inner edges are positioned just under circumferential grooves because stress is liable to concentrate on the ply edges and thus cracks are liable to occur in the groove bottom. Therefore, in order to prevent cracks, as shown in FIG. 4, the end of the inner ply 10A is shifted axially outwardly, and the end of the outer ply 10B is shifted axially inwardly.

In this case, the dislocation KO depends on the groove width but it should be limited to less than 0.4 times a distance which is the axial distance L1, L2 or L3 of the part Y1, Y2 or Y3 in which the ply edge is located.

When the end of the inner ply is shifted from the line n2 into the part Y3, the dislocation KO is less than 0.4 times L3. However, if the end is shifted into the part Y2, the dislocation KO is less than 0.4 times L2.

When the end of the outer ply is shifted from the line n1 into the part Y1, the dislocation KO is less than 0.4 times L1. However, if the end is shifted into the part Y2, the dislocation KO is less than 0.4 times L2.

What is claimed is:

1. A pneumatic radial tire comprising a tread portion with a tread, a pair of sidewall portions, a pair of bead portions, a carcass extending between the bead portions, a breaker-belt disposed radially outside the carcass in the tread portion, a band-belt disposed radially outside the breaker-belt and having organic fiber cords laid in substantially parallel with the tire equator, in the meridian section of the tire which is mounted on a standard rim and inflated to 0.5% of a standard inner pressure, the tread has a triple radius profile and the band-belt having a variable ply number accommodated to the triple radii of the tread such that the number of plies throughout more than 60% of the axial width of the parts of the tread having the first, second and third radii of curvature, respectively, are different from each other.

2. The pneumatic radial fire according to claim 1, wherein the tread profile is composed of a central part Y1 defined by a first curve of a radius R1 having the center in the equatorial plane, a pair of middle parts Y2 defined by a second curve of a radius R2 being smaller than the radius R1 and merged into the first curve at a first point on each side of the equatorial plane, and a pair of shoulder parts Y3 defined by a third curve of a radius R3 being smaller than the radius R2 and merged into the second curve at a second point on each side of the equatorial plane, and the ply number N2 in the middle parts is less than the ply number N3 in the shoulder parts but more than the ply number N1 in the central part.

3. The pneumatic radial tire according to claim 2, wherein the ply number N1 is 0, the ply-number N2 is 1, and the ply-number N3 is 2.

4. The pneumatic radial tire according to claim 2, wherein a half axial width L1 of the central part Y1 is 0.34 to 0.24 times the tread width TW, the axial width L2 of each middle part Y2 is less than the width L1 and 0.43 to 0.33 times the tread width TW, the axial width L3 of each shoulder part Y3 is more than the width L1 but less than the width L2 and 0.38 to 0.28 times the tread width TW, the radius R1 of the central part is 4.5 to 6.0 times the tread width TW, the radius R2 of the middle parts is 0.6 to 0.3 times the radius R1.

* * * * *